(12) United States Patent
Tanimoto et al.

(10) Patent No.: US 6,263,277 B1
(45) Date of Patent: Jul. 17, 2001

(54) ROUTE SEARCHING METHOD

(75) Inventors: Satoshi Tanimoto, Irvine; Koichi Endo, Torrance; David Hayes, Los Angeles, all of CA (US)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 09/633,244

(22) Filed: Aug. 7, 2000

(51) Int. Cl.⁷ .................................................. G06F 165/00
(52) U.S. Cl. ........................ 701/209; 701/208; 701/210; 701/211; 701/212; 340/988; 340/990
(58) Field of Search ..................................... 701/200, 207, 701/208, 209, 211, 212, 210, 201; 340/988, 990, 995; 73/178 R

(56) References Cited

U.S. PATENT DOCUMENTS

| | | | |
|---|---|---|---|
| 4,926,336 | 5/1990 | Yamada | 701/202 |
| 5,031,104 | 7/1991 | Ikeda et al. | 701/209 |
| 5,036,471 * | 7/1991 | Tamura et al. | 701/209 |
| 5,638,280 * | 6/1997 | Nishimura et al. | 701/209 |
| 6,049,753 * | 4/2000 | Nimura | 701/201 |
| 6,134,501 * | 10/2000 | Oumi | 701/209 |

* cited by examiner

Primary Examiner—William A. Cuchlinski, Jr.
Assistant Examiner—Gertrude Arthur
(74) Attorney, Agent, or Firm—Brinks Hofer Gilson & Lione

(57) ABSTRACT

A method of route searching in a navigation apparatus used to search out a route leading to a destination. Map information is produced by having the nodes on both ends of a link, the length of the link, the speed limit in the link, and the functional class of the link included in the link information. In making the route search, the speed limit in the link is corrected on the basis of the straight line distance to the destination and the functional class of the link, the time for traveling a link is calculated on the basis of the corrected speed limit and the link length, and the route minimizing the time required for reaching a destination is searched out on the basis of the link passing time. In the described case, the functional class is determined using road factors such as the width, speed limit, and type of the road. Correction is made such that the speed limit on higher class links becomes larger and the speed limit on lower class links becomes smaller. Also, the time necessary to pass through an intersection is estimated based on the functional classes of the traveled and intersecting links.

28 Claims, 10 Drawing Sheets

FIG. 4

| SC : SPEED CATEGORY | SPEED LIMIT V |
|---|---|
| 0 | 135k/h |
| 1 | 115k/h |
| 2 | 95k/h |
| 3 | 80k/h |
| 4 | 60k/h |
| 5 | 40k/h |
| 6 | 20k/h |
| 7 | 5k/h |

FIG. 5

| FC \ DISTANCE IN STRAIGHT LINE Dmg | -50 | -100 | -500 | -1000 |
|---|---|---|---|---|
| 0 (MAIN) | 0 | +5 | +10 | +20 |
| 1 (FIRST) | 0 | +5 | +10 | +15 |
| 2 (SECOND) | 0 | -5 | +5 | +10 |
| 3 (THIRD) | 0 | -5 | 0 | -10 |
| 4 (FOURTH) | 0 | -5 | -5 | -15 |
| 5 (LESS THAN FOURTH) | 0 | -10 | -10 | -20 |

ROUTE SEARCHING METHOD

BACKGROUND OF THE INVENTION

The present invention relates to a method of searching for routes and more particularly to a route searching method used with a navigation apparatus for determining an optimal route leading to a chosen destination.

An on-vehicle navigation apparatus detects the position of the vehicle, reads map data around the vehicle position from a map storage medium such as a DVD, and depicts the map on a display screen with a vehicle position marker superimposed at the vehicle's location on the map. The map can be scrolled as the vehicle moves forward while the vehicle position mark is fixed in a specific position, such as the center of the screen, and the map surrounding the vehicle's position can be viewed at a glance. In such an on-vehicle navigation apparatus, a route searching function may be provided to search out a route to enable travel from a starting point to a destination. It can determine the route, for example, taking the shortest time or the shortest distance, and display the route on the screen, thereby providing the vehicle driver with a driving guide. In such a route guiding function, the particular route is displayed with a thick, colored line during the actual driving, so that it can be distinguished from the other roads, allowing the driver to reach the destination easily. As the methods for searching out the guided route, along which the vehicle travels, from road map data, there are known the Dijkstra method, the A* algorithm, and the like.

The user of a route-searching navigation apparatus is not only concerned with the quality of the route, but also with the time necessary to produce it. An ideal navigation apparatus would be capable of solving a routing problem with faster speed and better quality. However, the quality of the solution and the time required for the search are generally in an inverse relationship. Practically speaking, a solution which is close to the optimum solution, obtained quickly, is more useful than finding the best solution with a longer searching time. The Dijkstra method or the A* algorithm, two commonly known methods, are able to provide an optimum path, but the broad range of the search increases the time that it takes. When the starting point is distant from the destination or the road network is dense, the optimal route searching time becomes even longer, as the number of intersections and links has become larger.

SUMMARY OF THE INVENTION

An object of the present invention is to make the selection of major roads, such as freeways, easier when there is a greater distance to a destination, even if the actual distance traveled is slightly extended.

Another object of the present invention is to make it possible to search for a close to optimal route to a destination in a short time.

A further object of the present invention is to make it possible to search out a close to optimal route to a destination, taking into account the time it takes to cross an intersection.

According to the present invention, the above mentioned objects can be attained by a method of route searching comprising the steps of: (1) producing map information by storing link information, including the nodes on both ends of a link, the link length, the speed limit in the link, and the functional class of the link; (2) in making the route search, correcting the speed limit in the link on the basis of both the straight line distance from the nodes of the examined link to the destination and the functional class of the link; (3) calculating the time for passing through the link with the corrected speed limit and the link length; and, (4) searching out the route required to reach a destination on the basis of the link passage time while minimizing the time required.

According to the present invention, the above mentioned objects can be attained by a method of route searching further comprising the steps of: (1) performing a route search from the starting point towards the destination by using links of the same functional class as the functional class of the link to which the start point belongs until a higher class link is reached; (2) performing a similar route search from the destination towards the starting point by using links of the same functional class as the functional class of the link to which the destination belongs until a higher class link is reached; (3) setting the node of the higher class link reached in the search from the start point as a new starting point and setting the node of the higher class link reached in the search from the destination as a new destination; (4) repeating the search, using the higher class links; and (5) connecting the routes when the two paths meet, thereby forming a guided route.

According to the present invention, the above mentioned objects can be attained by the method of route searching further comprising the steps of: (1) estimating the time for passing through a node by considering the functional class of an intersecting road and the vehicle's own link; and (2) correcting the link passing time by adding in the node passing time.

Other features and advantages of the present invention will be apparent from the following description of the invention, taken in conjunction with the accompanying drawings.

BRIEF DESCRIPTION OF THE DRAWINGS

FIG. 4 is a table showing the relationship between the assigned speed category and the speed limit.

FIG. 5 is an example of a speed limit correction value table.

DESCRIPTION OF THE PREFERRED EMBODIMENTS (a) General Schematic of On-vehicle Navigation Apparatus FIG. 1 is a general schematic drawing of the on-vehicle navigation apparatus of the present invention. Reference numeral 11 denotes a map information memory for storing map data, such as a DVD (Digital Video Disk). The map is partitioned such that each section thereof has suitable length in both the longitudinal direction and in the latitudinal direction in accordance with a reduced scale. In the map, a road is indicated by a set of nodes, each of which is represented by longitudinal and latitudinal coordinates. The road can be depicted by sequentially connecting the nodes with straight lines. The portion of a road connecting two nodes is called a link. Therefore, a road is formed of a number of links.

Figure 2:
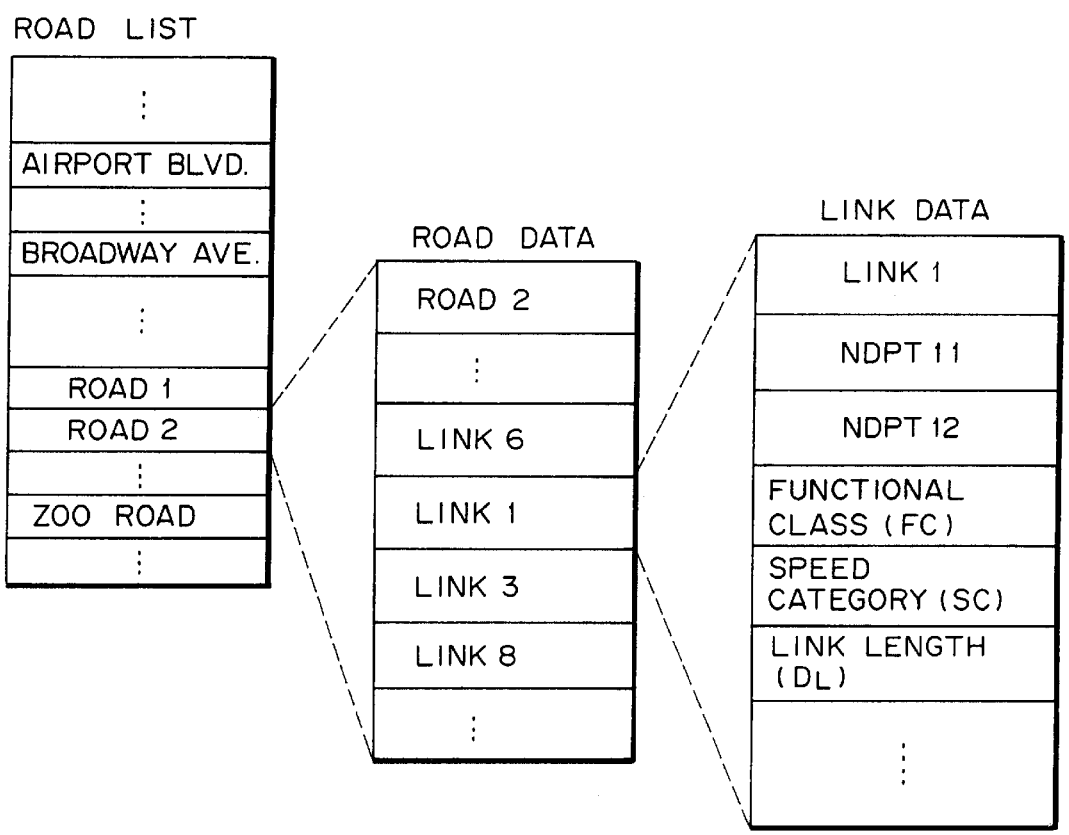
FIG. 2 is an explanatory drawing of map data storage.
Figure 3:
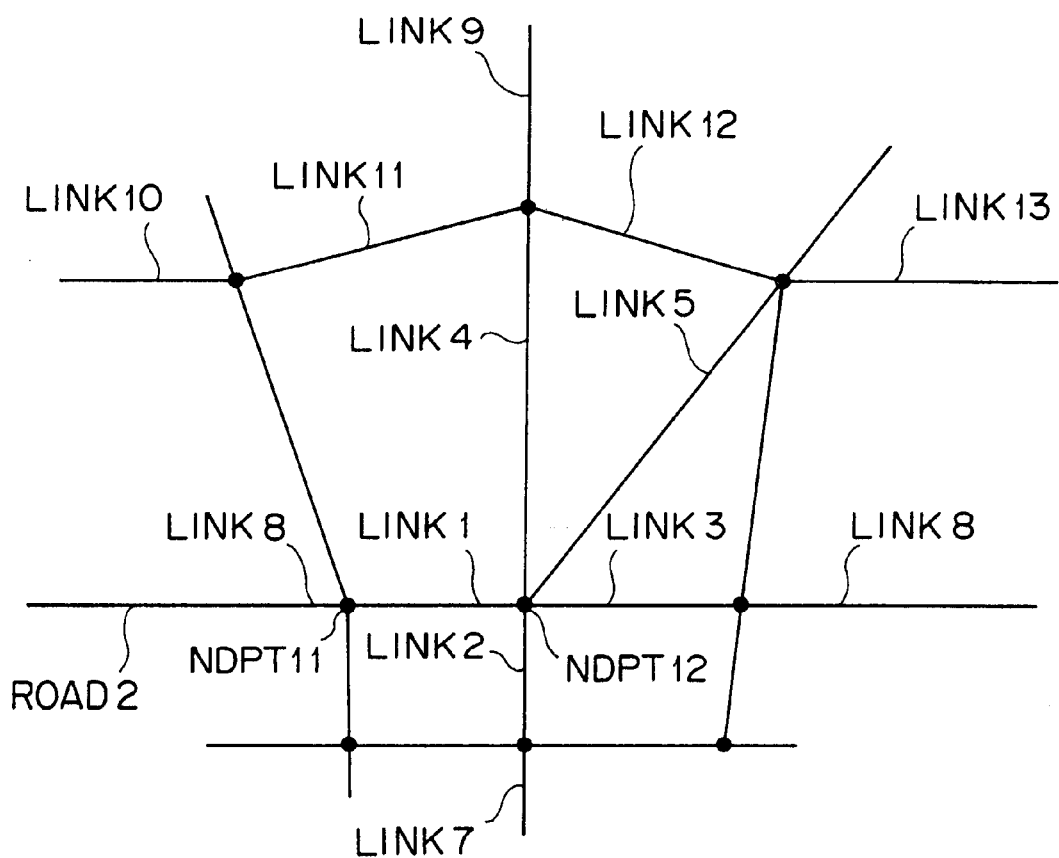
FIG. 3 is an explanatory drawing of road data.

The map data structure, as shown in FIG. 2, contains a list of roads, road data for each road, and link data of each link in the road. The road data contains the road name and the link IDs constituting the road. For a road network such as shown in FIG. 3, the road data of Road 2 can be expressed as shown in FIG. 2. The link data (Link Data), as shown in FIG. 2, contains (1) the node IDs (NDPT11, NDPT12) at both ends of the link, (2) the link length, $D_L$, (3) the speed category, SC, specifying the speed limit in the link, (4) the functional class, FC, of the link, (5) one-way traffic information, (6) the number of lanes, (7) whether or not the link has a toll, and other such data. The relationship between the speed category, SC, and the speed limit, V, could be as shown in FIG. 4, where the speed limits V are divided into 8 classes, 0–7. The functional class, FC, of a link is determined by taking into consideration functional factors such as the width of the link (or the number of lanes, the speed limit, and the class of the road. For example, the functional class can be divided into 6 classes, FC=0–5. FC=0 denotes the main class (a freeway),. FC=1 denotes a first class road (a tollway/interstate highway). FC=2 denotes a second class road (a general national road). FC=3 denotes a third class road (a state road). FC=4 denotes a fourth class road (a road smaller than a state road). FC=5 denotes a Less-Than-Fourth class road (a narrow street).

Figure 1:
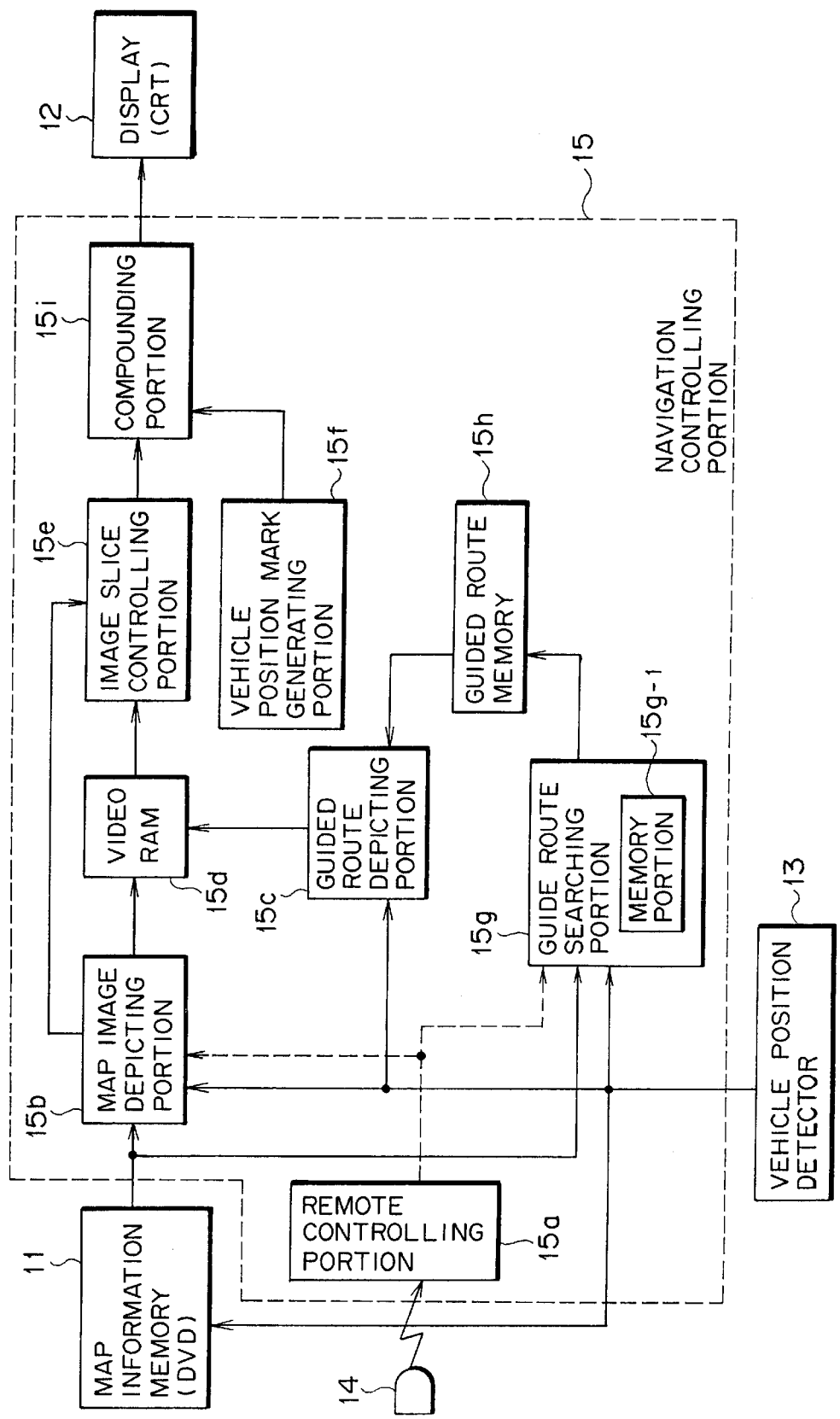
FIG. 1 is a schematic drawing of a general on-vehicle navigation apparatus embodying the present invention.

Returning to FIG. 1, reference numeral 12 denotes a display unit (CRT). This would depict a map image corresponding to the current position of the vehicle, with a mark indicating the vehicle position and any selected guided route. Reference numeral 13 denotes a vehicle position detector for calculating the absolute vehicle position (its latitude and longitude). This is accomplished by using an orientation sensor, such as a vibrating gyroscope, to detect the vehicle's traveling direction, a distance sensor generating a pulse at each predetermined distance traveled by the vehicle, and a GPS receiver, that receives electric signals from GPS satellites in order to measure the absolute vehicle position (the above subunits are not shown in the drawing).

Reference numeral 14 denotes a remote control. This can be used for selecting from a menu list displayed on the screen, or for scrolling the map.

Reference numeral 15 denotes a navigation control unit, which comprises the subunits that (1) generate the map image around the vehicle using the map data; (2) search the map for optimal routes; and (3) generate the vehicle position mark and the guided route image.

Within the navigation control unit 15, reference numeral 15a denotes a remote control subunit that receives signals, corresponding to remote control operations, to give instructions to each part. Reference numeral 15b denotes a map image depicting portion reading a set of map data from the map storage memory 11 that covers a larger range than the range of the displayed image around the current vehicle position. For example, it could read a set of map data corresponding to a 9 screen range. It could also generate a map image in a dot-image format based on the set of map data. Reference numeral 15c denotes a guided route depicting portion for generating a guided route image on the basis of route data obtained through a guided route search process. Reference numeral 15d denotes a video RAM for storing the map image and the guided route image. The map image depicting portion 15b updates the video RAM 15d while the vehicle advances so the range of the display screen does not go beyond the range of the image in the video RAM 15d. The guided route depicting portion 15c also generates the guided route image in accordance with the vehicle's motion so the image is stored in the video RAM 15d. Reference numeral 15e denotes an image slice controlling portion for slicing off a one-screen portion of the map image from the video RAM 15d such that the vehicle's current position is in the center of the display screen. Slicing instructions are given by the map image depicting portion 15b. Reference numeral 15f denotes a vehicle position mark generating portion for displaying the vehicle position mark in the center of the display screen.

Reference numeral 15g denotes a guided route searching portion that conducts a search for a guided route from a starting point to a destination based on the map information. The guided route searching portion 15g could make the search in accordance with the A* algorithm. This algorithm obtains an optimal route minimizing the total time required for traveling all of the links from the starting point to the destination. Reference numeral 15g-1 denotes a memory portion for storing a table of speed limit correcting values. The table of speed limit correcting values, as shown in FIG. 5, stores correcting values Vc of the link speed limit V according to the combination of the straight line distance Dmg to the destination and the functional class FC of the link. The speed correcting value $V_c$ is determined such that, the longer the distance to the destination is, the higher class link (road) is selected as the route. More specifically, (1) the speed correcting value Vc is set such that on a higher class road, the speed limit becomes greater (Vc>0), and on a lower class road, the speed limit becomes smaller (Vc<0), and (2) the absolute value of the speed correcting value, Vc becomes greater as the straight-line distance to the destination increases.

Returning to FIG. 1, reference numeral 15h denotes a guided route memory for storing the guided route from the starting point to the destination. Reference numeral 15i denotes a compounding portion for compounding the map image and guided route image read out from the video RAM 15d and the vehicle position mark image read out from the vehicle position mark generating portion 15f. The compound image is output to the display unit 12 to be displayed thereon as an image.

(b) First Route Searching Process

The A* algorithm is an algorithm for finding a shortest-length route or a shortest-time route. In the searching step of the A* algorithm, the evaluation function, f(n), of a node n (an intersection in a traffic network) is defined as $$f(n)=g(n)+h(n) \quad (1)$$

where h(n) is the minimum cost (heuristic function) estimated to be necessary from the node n to the destination node, and g(n) is the actual cost from the starting point node to the node n.

The search, which minimizes the evaluation function of the node, branches out at each step, and thus, the search is advanced.

An equation for the heuristic function that provides good results in searching for the shortest time route is:

$h(n)$=[straight line distance from node n to goal G divided by average traveling speed $V_{avr}$] (2)

Figure 6:
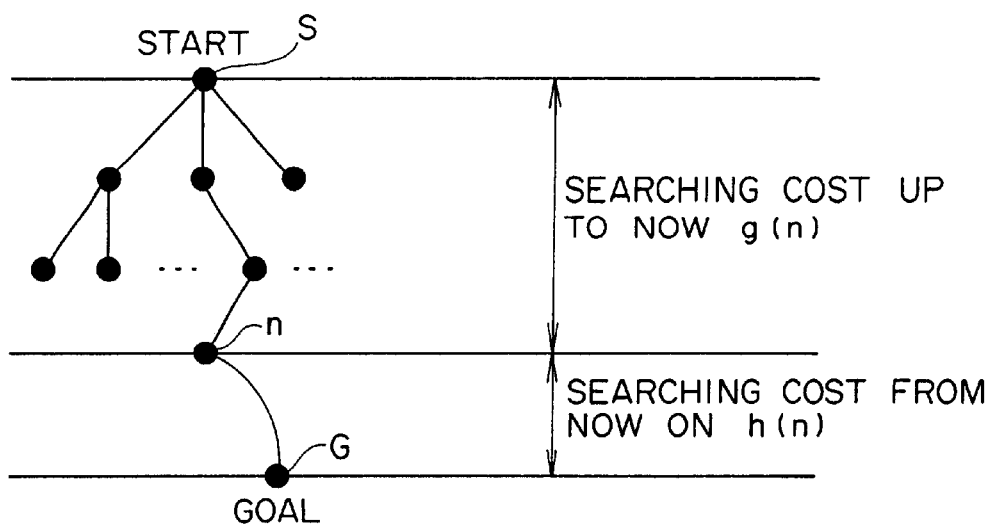
FIG. 6 is an explanatory diagram of the evaluation function in the A* algorithm.

FIG. 6 is an explanatory diagram of the evaluation function, in which S denotes the starting point, G denotes the destination, and n denotes the node being examined. The A* algorithm has two characteristic features as follows:

if a route exists from the starting point S to the destination G, it is always possible to find that route (solution); and as long as the heuristic function, h(n), is not beyond the actual cost, it is possible to find the shortest-time route.

Since the straight line distance between two points in the road network is always equal to or smaller than that of the shortest-length route connecting the two points, the heuristic function in equation (2) never exceeds the true cost, and it is therefore possible to always obtain the shortest-time route.

Figure 7:
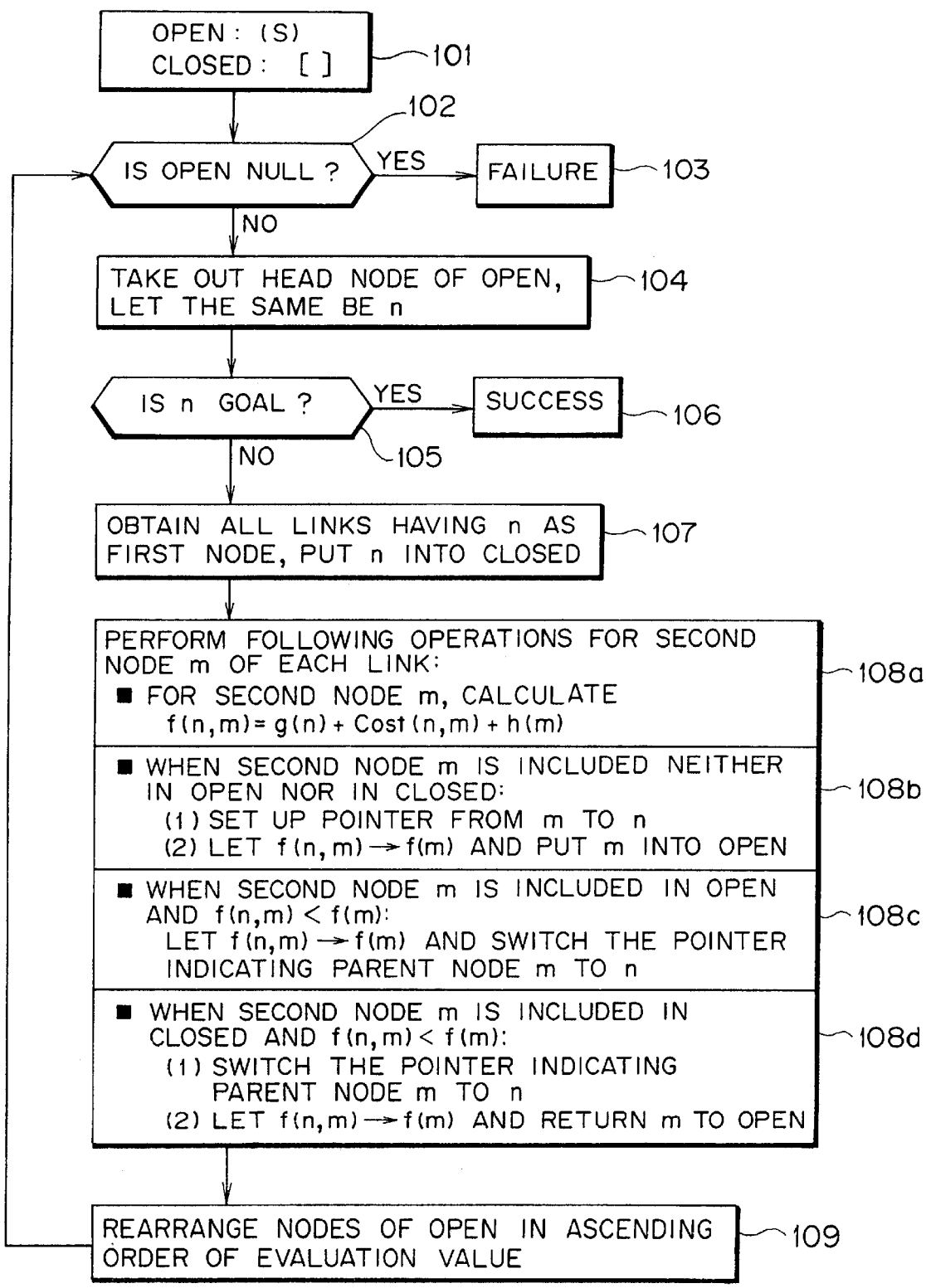
FIG. 7 is a route search processing flowchart using the A* algorithm of the present invention.

FIG. 7 shows a processing flowchart according to the A* algorithm of the present invention. The cost of a link(n, m) from a node n ("parent node") to a node m ("child node") is denoted by "cost(n, m)". The process to obtain all the links connected to a node n is called "development". A set of nodes that are developable is defined as OPEN and a set of nodes already developed is defined as CLOSED.

At the time of initialization, the starting point S is the only node constituting the set OPEN, while the set CLOSED is a null set (Step 101).

Namely, the initial setting is made as follows:

OPEN: (S)

CLOSED: []

Then, the set OPEN is checked to see if it is a null set (Step 102). If it is a null set, it is determined that the optimum-route search was a failure (Step 103). If it is not a null set, the head node (the start point S at the time of initialization) of the set OPEN is taken and defined as n (Step 104). Upon the head node being taken, the node is deleted from the set OPEN.

Then, the node n is checked to see if it is the destination G (Step 105). If it is the destination, the route search proves successful (Step 106). Hence, by tracing the route from the destination G to the starting point S with a pointer, as described later, the shortest-time route can be obtained.

If the node n is not found to be the destination G at Step 105, all the links connected to the node n are obtained and the node n is placed into the set CLOSED (Step 107). Then, Steps 108a–108d are carried out for each child node of all the obtained links L(n, m).

The evaluation value of each child node m is calculated by the equation $f(n, m) = g(n) + cost(n, m) + h(m)$ (3)

Figure 8:
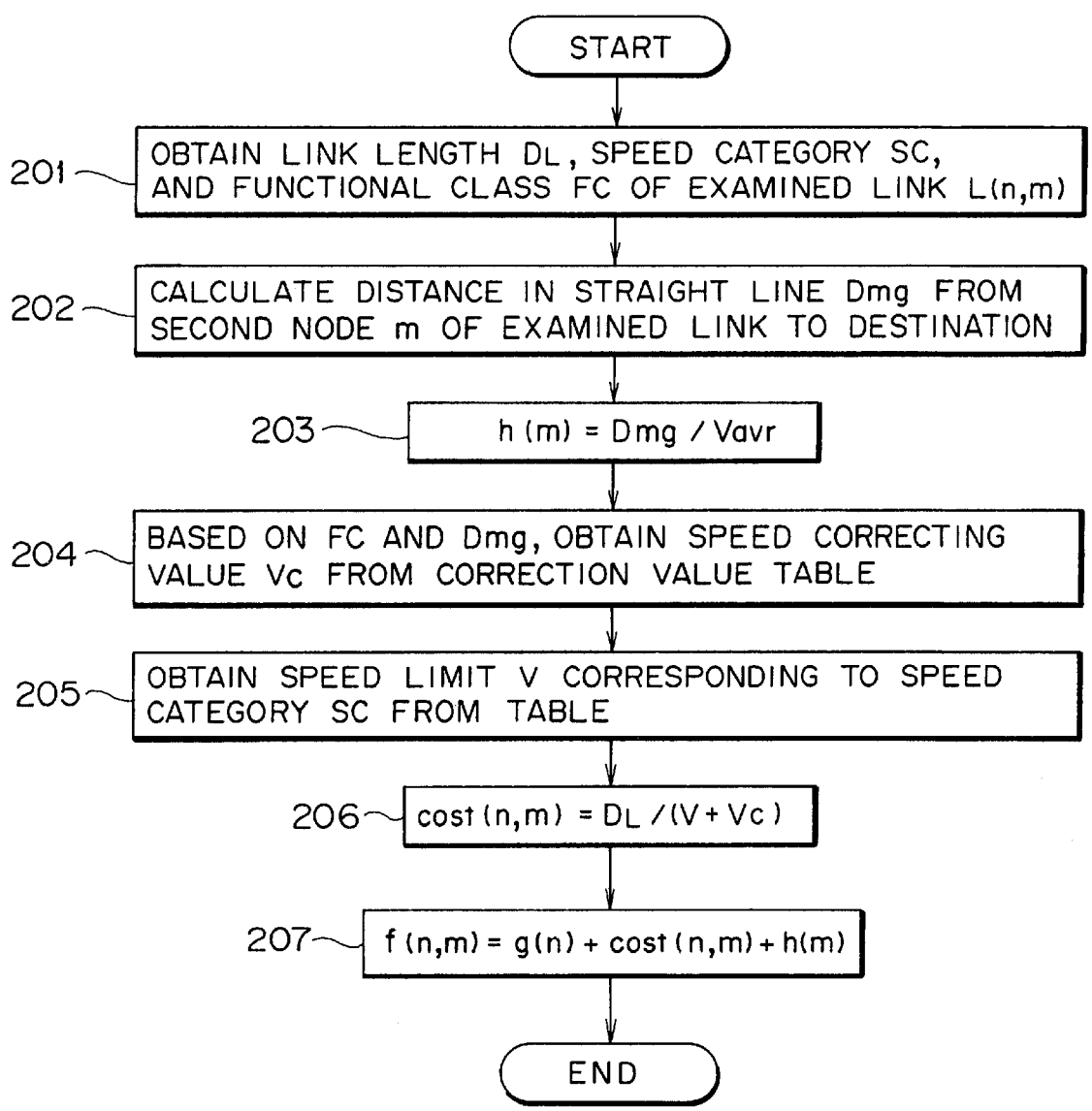
FIG. 8 is an evaluation value calculation flowchart.

(Step 108a). The value g(n) in the above equation (3) is the actual cost up to the node n and it is known. The calculation of the evaluation value f(n,m) by equation (3) is carried out through the flowchart shown in FIG. 8.

First, the link length, $D_L$, the speed category, SC, and the functional class, FC, of the link L(n, m) are obtained (Step 201). Then, the straight line distance, Dmg, from the child node of the examined link L(n, m) to the destination is calculated (Step 202). The heuristic function, h(m), is calculated according to the following equation:

$h(m) = D_{mg}/V_{avr}$ (4)

by using the average speed $V_{avr}$ (Step 203).

The speed correcting value Vc is obtained from the correction value table (refer to FIG. 5) based on the functional class FC and the straight line distance $D_{mg}$ (Step 204). The speed limit V corresponding to the speed category SC is obtained from the speed limit table (refer to FIG. 4) (Step 205). Thereafter, the link passing time, cost(n, m), is calculated by the following equation:

$cost(n,m) = D_L/(V+V_c)$ (5)

(Step 206). Finally, the evaluation value f(n, m) is calculated according to equation (3) using g(n), cost(n, m), and h(m) (Step 207).

Once the evaluation function, f(n, m), is calculated, the child node, m, is checked against the sets OPEN and CLOSED.

If the child node is included neither in the set OPEN nor in the set CLOSED, (1) a pointer from the child node, m, and the parent node, n, is created and (2) f(m) is set equal to the evaluation value f(n, m), (f(n, m)→f(m)). This connects both the pointer and the evaluation value f(m) with the child node m. The child node m is then put into the set OPEN (Step 108b).

If the child node m is included in the set OPEN, the evaluation value f(m) connected to the node of the set OPEN ("first evaluation value") is compared with the evaluation value f(n, m) calculated above ("second evaluation value"). If the second evaluation value is the smaller of the two, the evaluation value of the node m of the set OPEN is updated with the second evaluation value f(n, m) (f(n, m)→f(m)), and the pointer is updated such that the parent node of the node m becomes the node n (Step 108c). However, if the second evaluation value f(n, m) is greater than the first evaluation value f(m), the process at Step 108c is not performed and the examined child node m is abandoned.

Step 108c is such that when a route to reach a node m with a better evaluation value than the currently "best" route is found, the pointer is updated and the route having the better evaluation value is used as the new "best" route.

Finally, if the child node m is included in the set CLOSED, the evaluation value f(m) connected with the node of the set CLOSED ("first evaluation value") is compared with the evaluation value f(n,m) calculated above ("second evaluation value"). If the second evaluation value is the smaller of the two, the pointer is updated such that the parent node of the examined node (child node m) of the set CLOSED becomes the node n and, in addition, the evaluation value of the examined node is updated with the second evaluation value f(n, m) (f(n, m)→f(m)). The examined node is then returned to the set OPEN (Step 108d). If the second evaluation value f(n, m) is greater than the first evaluation value, though, the process at Step 108d is not performed and the examined child node m is abandoned.

Step 108d is such that when a route to reach a node m with a better evaluation value than the current "best" route is found and the node m is already developed, the pointer of the node m is updated and the route with the better evaluation value is established as the new "best" route. In addition, the node m is connected with the new "best" route and restored in the set OPEN as having developability.

Finally, based on the evaluation value of each node, the nodes constituting the set OPEN are rearranged in ascending order of evaluation value (Step 109). The node whose evaluation value is the smallest, and therefore considered the most suitable one at the current point of time, is placed at the head of the set OPEN. Processing then returns to Step 102 and the subsequent processes are performed repeatedly until the destination G is reached.

When the destination G is reached, the shortest-time route from the starting point S to the destination G can be obtained by tracing the pointer route.

According to the above described first route searching process, the speed correcting value $V_c$ is defined such that the speed limit V becomes larger for higher class roads ($V_c$>0) and smaller for lower class roads ($V_c$<0). Further, the longer the straight line distance to the destination is, the greater the absolute value $|V_c|$ of the speed correcting value. Therefore, as the distance to the destination G becomes longer, it becomes possible to select the higher class link (road) as the route.

(c) Another Process for Calculating Evaluation Value

In the above, the evaluation value f(n, m) was calculated without considering the intersection passing time. It is also possible, though, to calculate the evaluation value by taking the intersection passing time into consideration.

Figure 9A:
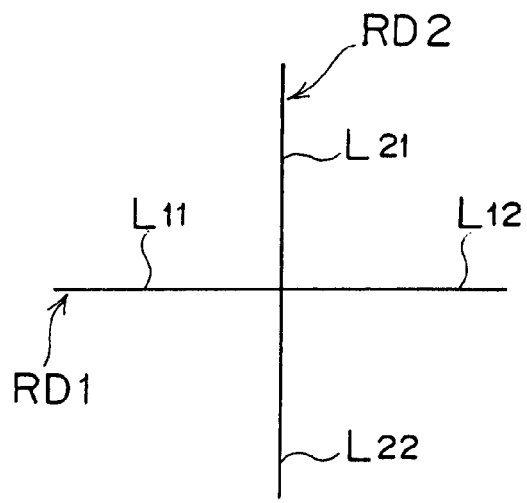
FIG. 9A and FIG. 9B are explanatory drawings of intersection passing time.
Figure 9B:
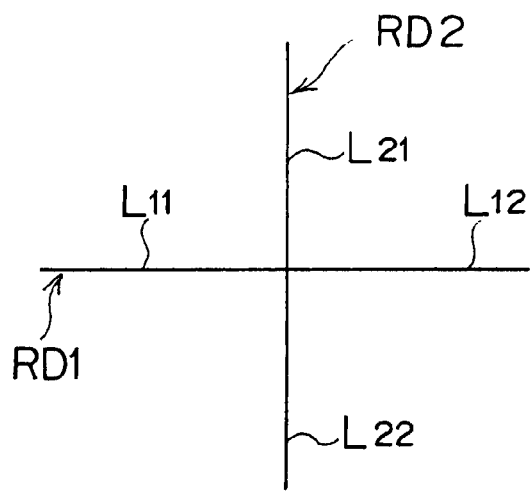

The map data does not contain such information as existence or absence of a traffic signal or stop sign, necessity for stopping, or waiting time for a signal light. Therefore, the time $T_{ps}$ for passing an intersection is estimated by taking the functional class of the traveled link and the intersecting link into consideration. The intersection passing time $T_{ps}$ is added to the link passing time cost(n, m) to correct the time for passing the link. When, as shown in FIG. 9A, the link along which the vehicle travels ($L_{11}$, $L_{12}$) has a higher functional class, FC, than the intersecting link ($L_{21}$, $L_{22}$), the intersection passing time is set at a short time, $T_s$. However, when the link along which the vehicle travels is lower than the intersecting link in terms of the functional class the intersection passing time is set at a longer time, $T_L$ (>$T_s$). When, as shown in FIG. 9B, the link along which the vehicle travels ($L_{11}$, $L_{12}$) is the same as the intersecting link ($L_{21}$, $L_{22}$) in terms of the functional class, the intersection passing time is set at the intermediate time period between $T_s$ and $T_L$, i.e., $T_M$ (=($T_s$+$T_L$)/2).

Figure 10:
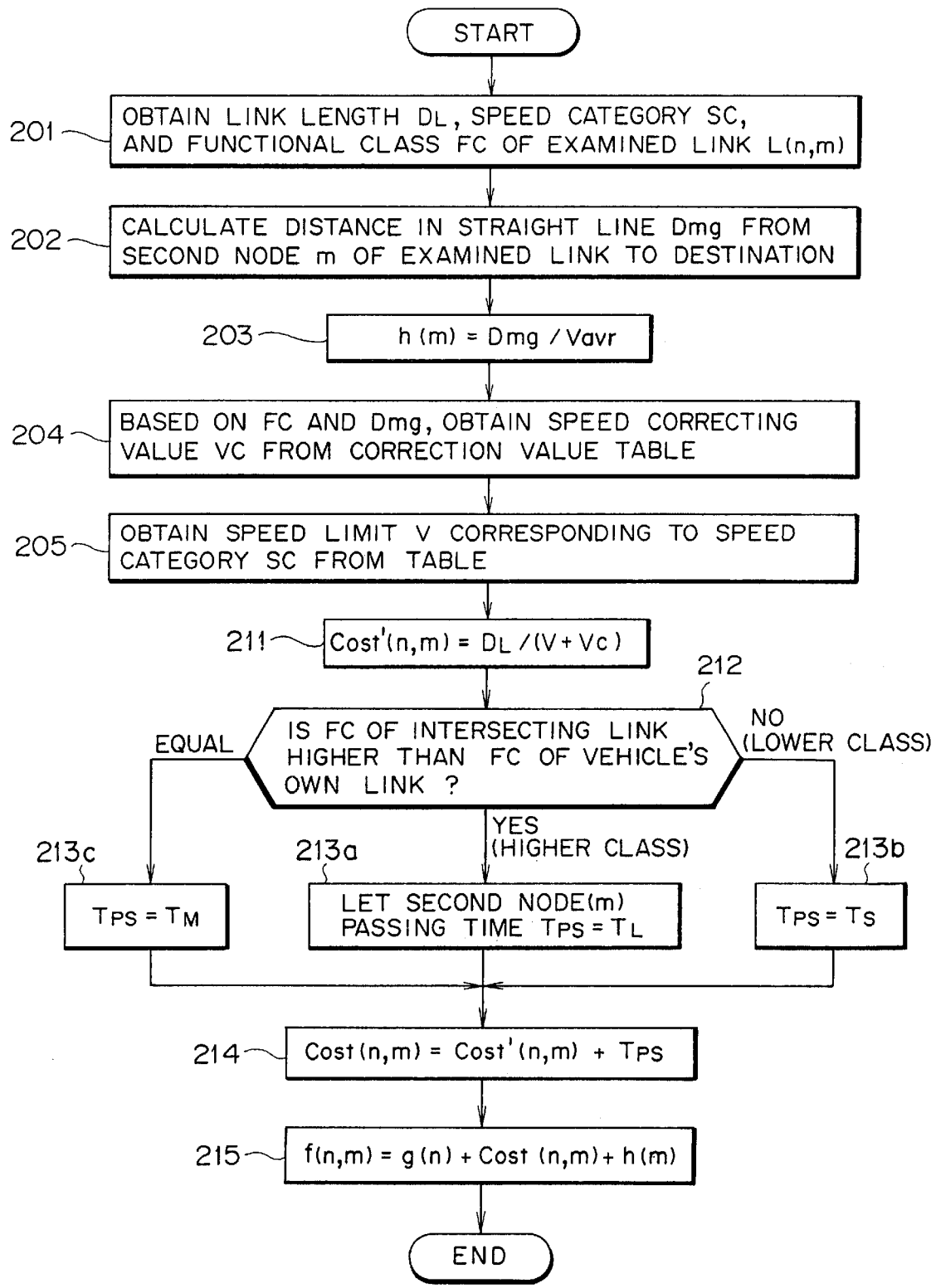
FIG. 10 is an evaluation value calculation flowchart, taking the intersection passing time into consideration.

FIG. 10 shows a processing flowchart for calculating the evaluation value using the intersection passing time. The processing flowchart down to Step 205 is the same as that in the processing flowchart of FIG. 8. Upon obtaining the speed limit V corresponding to the speed category SC from the speed limit table at Step 205, cost'(n,m) is calculated according to the equation $$cost'(n,m)=D_L/(V+V_c) \quad (5)'$$

(Step 211). Then, the functional class of the intersecting link at the child node m is checked to see whether it is higher than the class of the vehicle's own link (Step 212). If the former is of a higher class, the intersection passing time is set at $T_{ps}=T_L$ (Step 213a). If it is of a lower class, the intersection passing time is set at $T_{ps}=T_s$ (Step 213b). If they are of the same class, the intersection passing time is set at $T_{ps}=T_M$ (Step 21 3c).

The link passing time cost(n,m) is then calculated according to the equation:

$$cost(n,m)=cost'(n,m)+T_{ps} \quad (6)$$

(Step 214). Finally, the evaluation value f(n,m) is calculated according to equation (3) by using g(n), cost(n,m), and h(m) (Step 215).

(d) Second Route Searching Method

In the first route searching method in FIG. 7, the A* algorithm is applied to all the links. However, if all of the links are taken as objects, the searching time becomes longer. Therefore, in the process of the second route searching method: (1) a route search is performed using links of the same class as the functional class FC of the link to which the start point belongs, from the start point toward the destination, until a higher class link is reached; (2) a similar route search is performed using links of the same class as the functional class FC of the link to which the destination belongs, from the destination toward the start point, until a higher class link is reached; (3) the node of the higher class link reached in the search from the starting point is set as the new starting point, and the node of the higher class link reached in the searches from the destination is set as the new destination; (4) the above described processes are repeated by using the new starting and destination points; and (5) when the destination is reached using links of a certain class, the routes of each class obtained in the searches from the starting point side and the destination side are sequentially connected to obtain the guided route. In the above, the class of the link having the new starting point as one node and the class of the link having the new destination as one node are the same.

Figure 11:
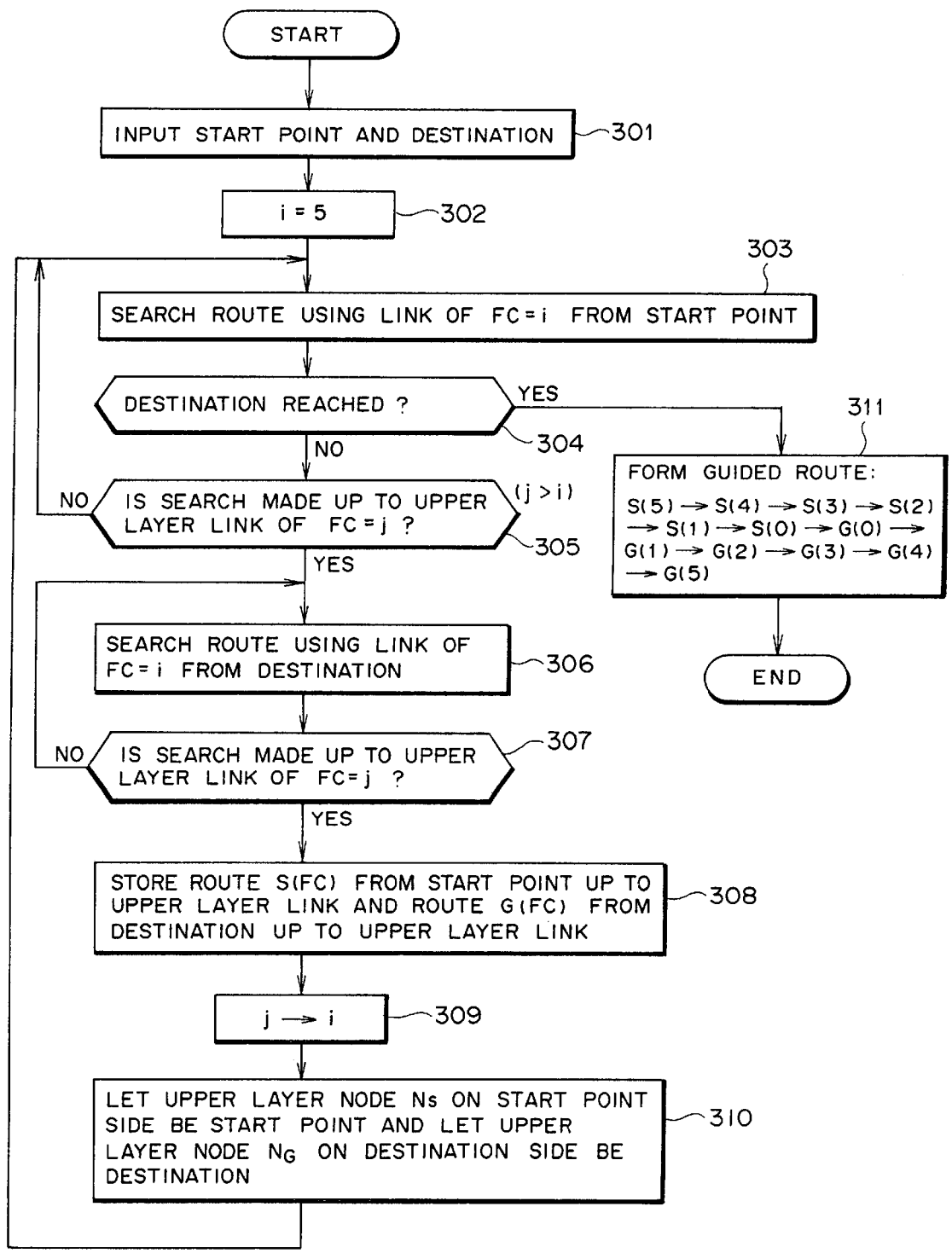
FIG. 11 is a second route search processing flowchart of the present invention.

FIG. 11 shows the flowchart of the second route searching method of the present invention.

First, the starting point (current vehicle position) and the destination are input (Step 301) and i=5 (the lowest functional class) is set up (Step 302). The first route searching process of FIG. 7 is performed from the starting point using only links of FC=i (Step 303) and it is checked whether the destination is reached (Step 304). If the destination is not yet reached, it is checked whether searching up to the link of higher class (upper layer) of which FC=j (<i) has been made (Step 305). If not, the process down from the Step 303 is repeated.

In the case of a YES answer at Step 305, the first route searching process of FIG. 7 is performed from the destination using only links of FC=i (Step 306) and it is checked whether searching up to the upper layer node of which FC=j (<i) has been made (Step 307). If not, the process down from the Step 306 is repeated. If the searching up to the upper layer node of which FC=j (<i) has been made, the route from the start point to the upper layer link S(FC) and the route from the destination to the upper layer link G(FC) are stored (Step 308).

Then i is set to j (Step 309) and the node Ns of the upper layer link on the side of the starting point is set as the new starting point and the node $N_G$ of the upper layer link on the side of the destination is set as the new destination (Step 310) and, the process down from the Step 303 is repeated.

When the destination is finally reached at Step 304, the stored routes of each class from the side of the start point (S(5), S(4), S(3), S(2), S(1), and S(0)), and the stored routes of each class from the side of the destination (G(5), G(4), G(3), G(2), G(1), and G(0)), are sequentially connected to form the guided route S(5)→S(4)→S(3)→S(2)→S(1)→S(0)→G(0)→G(1)→G(2)→G(3)→G(4)→G(5) (Step 311).

Incidentally, if the evaluation values are the same in the route searching process at Step 303, the route searching is performed such that a higher functional class link is selected.

According to the second route searching process, a functional class is allocated to each link. If the starting point and the destination are nodes of which FC=i, the route searching is performed using only links of which FC=i and, when higher class links of which FC=j(<i) are reached, the route searching is performed using only higher links of which FC =j. Since the route searching is continued on in this manner, the number of links considered as objects of the route search becomes smaller and the route search time becomes shorter.

Further, in the second route searching method, the speed correction value $V_c$ is determined such that the speed limit V becomes greater on higher class roads ($V_c>0$) and smaller on lower class roads ($V_c<0$). The absolute value $|Vc|$ of the speed correction value becomes greater when the straight line distance to the destination is greater. Therefore, it becomes possible to reach a higher class link swiftly and reduce the searching time that is necessary. Since there are less higher class links, and the area becomes wider, higher class links can be reached swiftly and the searching time can be reduced.

Although the A* algorithm has been used above for route searching, other route searching processes using the Dijkstra method or other such methods are also applicable.

As many widely different embodiments of the present invention can be made without departing from its spirit and scope, it is to be understood that the invention is not limited to the specific embodiments presented herein except as defined in the appended claims.

What is claimed is:

1. A method of route searching in a navigation apparatus for searching out a route leading to a destination comprising the steps of:

providing map information having the nodes on both ends of a link, the length of the link, the speed limit of the link, and the functional class of the link included in the link information;

correcting, in making the route search, the speed limit in said link on the basis of a straight line distance to a destination and the functional class of the link;

calculating the time for traveling on a link on the basis of the corrected speed limit and the link length; and searching, on the basis of the link travel time, for a route minimizing the time required for reaching a destination.

2. A method of route searching according to claim 1, further comprising the steps of:

determining said functional class using functional factors of the road, including at least one from the group of width, speed limit, and type of road; and setting a speed correcting value so that the speed limit in a higher class link becomes larger and the speed limit in a lower class link becomes smaller.

3. A method of route searching according to claim 2, further comprising the step of:

making the correcting value larger as the straight-line distance to the destination gets longer.

4. A method of route searching according to claim 3, further comprising the steps of:

providing a table for storing speed limit correcting values based on the combination of the straight line distance to a destination and the functional class of a link; and correcting the speed limit of a link using the correcting value obtained from said table.

5. A method of route searching according to claim 1, further comprising the steps of:

estimating the time for passing through a node by considering the functional classes of an intersecting road and the vehicle'own link; and correcting said link passing time by adding in said node passing time.

6. A method of route searching according to claim 5, further comprising the steps of:

determining said functional class using functional factors of the road, including at least one from the group of width, speed limit, and type of road; and setting a speed correcting value so that the speed limit in a higher class link becomes larger and the speed limit in a lower class link becomes smaller.

7. A method of route searching according to claim 6, further comprising the step of:

making the correcting value larger as the straight-line distance to the destination gets longer.

8. A method of route searching according to claim 7, further comprising the steps of:

providing a table for storing speed limit correcting values based on the combination of the straight line distance to a destination and the functional class of a link; and correcting the speed limit of a link using the correcting value obtained from said table.

9. A method of route searching in a navigation apparatus for searching out a route leading to a destination comprising the steps of:

providing map information having the nodes on both ends of a link, the length of the link, the speed limit of the link, and the functional class of the link included in the link information;

correcting, in making the route search, the speed limit in said link on the basis of the straight line distance to a destination and the functional class of the link;

calculating the time for traveling on a link on the basis of the corrected speed limit and the link length;

searching, on the basis of the link travel time, for a route minimizing the time required for reaching a destination;

performing a route search using links of the same class as the functional class of the link to which the start point belongs from said starting point toward a destination until a higher class link is reached;

performing a route search by using links of the same class as the functional class of the link to which the destination belongs from said destination toward the starting point until a higher class link is reached;

setting the node of the higher class link reached in the search from said starting point as a new starting point and setting the node of the higher class link reached in the search from said destination as a new destination, and thereupon repeating said processing by using said higher class links; and connecting, when the destination is reached, the routes of each class obtained in the search from the side of the starting point and the routes of each class obtained in the search from the side of the destination, sequentially, thereby forming a guided route.

10. A method of route searching according to claim 9, further comprising the step of:

making identical the class of the link having said new starting point as the node and the class of the link having said new destination as the node.

11. A method of route searching according to claim 10, further comprising the steps of:

determining said functional class using functional factors of the road, including at least one from the group of width, speed limit, and type of road; and setting a speed correcting value so that the speed limit in a higher class link becomes larger and the speed limit in a lower class link becomes smaller.

12. A method of route searching according to claim 11, further comprising the step of:

making the correcting value larger as the straight-line distance to the destination gets longer.

13. A method of route searching according to claim 12, further comprising the steps of:
  providing a table for storing speed limit correcting values based on the combination of the straight line distance to a destination and the functional class of a link; and
  correcting the speed limit of a link using the correcting value obtained from said table.

14. A method of route searching according to claim 9, further comprising the steps of:
  estimating the time for passing through a node by considering the functional classes of an intersecting road and the vehicle's own link; and
  correcting said link passing time by adding in said node passing time.

15. A method of route searching according to claim 14, further comprising the step of:
  making identical the class of the link having said new starting point as the node and the class of the link having said new destination as the node.

16. A method of route searching according to claim 15, further comprising the steps of:
  determining said functional class using functional factors of the road, including at least one from the group of width, speed limit, and type of road; and
  setting a speed correcting value so that the speed limit in a higher class link becomes larger and the speed limit in a lower class link becomes smaller.

17. A method of route searching according to claim 16, further comprising the step of:
  making the correcting value larger as the straight-line distance to the destination gets longer.

18. A method of route searching according to claim 17, further comprising the steps of:
  providing a table for storing speed limit correcting values based on the combination of the straight line distance to a destination and the functional class of a link; and
  correcting the speed limit of a link using the correcting value obtained from said table.

19. A method of route searching in a navigation apparatus for searching out a route leading to a destination comprising the steps of:
  providing map information having the speed limit and functional class of each link included in the link information;
  performing a route search using links of the same class as the functional class of the link to which the start point belongs from said starting point toward a destination until a higher class link is reached;
  performing a route search by using links of the same class as the functional class of the link to which the destination belongs from said destination toward the starting point until a higher class link is reached;
  setting the node of the higher class link reached in the search from said starting point as a new starting point and setting the node of the higher class link reached in the search from said destination as a new destination, and thereupon repeating said processing by using said higher class links; and
  connecting, when the destination is reached, the routes of each class obtained in the search from the side of the starting point and the routes of each class obtained in the search from the side of the destination, sequentially, thereby forming a guided route.

20. A method of route searching according to claim 19, further comprising the step of:
  making identical the class of the link having said new starting point as the node and the class of the link having said new destination as the node.

21. A method of route searching according to claim 20, further comprising the steps of:
  determining said functional class using functional factors of the road, including at least one from the group of width, speed limit, and type of road; and
  setting a speed correcting value so that the speed limit in a higher class link becomes larger and the speed limit in a lower class link becomes smaller.

22. A method of route searching according to claim 21, further comprising the step of:
  making the correcting value larger as the straight-line distance to the destination gets longer.

23. A method of route searching according to claim 22, further comprising the steps of:
  providing a table for storing speed limit correcting values based on the combination of the straight line distance to a destination and the functional class of a link; and
  correcting the speed limit of a link using the correcting value obtained from said table.

24. A method of route searching according to claim 19, further comprising the steps of:
  estimating the time for passing through a node by considering the functional classes of an intersecting road and the vehicle's own link; and
  calculating a link passing time including said node passing time.

25. A method of route searching according to claim 24, further comprising the step of:
  making identical the class of the link having said new starting point as the node and the class of the link having said new destination as the node.

26. A method of route searching according to claim 25, further comprising the steps of:
  determining said functional class using functional factors of the road, including at least one from the group of width, speed limit, and type of road; and
  setting a speed correcting value so that the speed limit in a higher class link becomes larger and the speed limit in a lower class link becomes smaller.

27. A method of route searching according to claim 26, further comprising the step of:
  making the correcting value larger as the straight-line distance to the destination gets longer.

28. A method of route searching according to claim 27, further comprising the steps of:
  providing a table for storing speed limit correcting values based on the combination of the straight line distance to a destination and the functional class of a link; and
  correcting the speed limit of a link using the correcting value obtained from said table.

* * * * *